United States Patent

Fanselow

[15] 3,704,938

[45] Dec. 5, 1972

[54] PUNCH CARD VIEWER

[72] Inventor: Hyman Fanselow, 978 E. 105th Street, Brooklyn, N.Y. 11236

[22] Filed: Oct. 1, 1970

[21] Appl. No.: 77,173

[52] U.S. Cl. ....................350/241, 350/190, 350/116
[51] Int. Cl. ..............................................G02b 27/02
[58] Field of Search .......................350/239–241, 243, 350/244, 245–248, 291

[56] References Cited

UNITED STATES PATENTS

| | | | |
|---|---|---|---|
| 2,319,436 | 5/1943 | Balie | 350/241 |
| 2,390,439 | 12/1945 | Johnson | 350/291 |
| 2,826,959 | 3/1958 | Schneider | 350/241 |
| 2,501,550 | 3/1950 | Tamagna et al. | 350/247 |
| D183,382 | 8/1958 | Chapman | 350/241 |
| 3,065,668 | 11/1962 | Legbourn et al. | 350/241 |

*Primary Examiner*—David Schonberg
*Assistant Examiner*—Michael J. Tokar
*Attorney*—Polachek & Saulsbury

[57] ABSTRACT

A Punch Card Viewer is provided in the form of a magnifying glass having a flat rear face and a rounded magnifying top face and a vertically extending leading slot adapted to block out all data and holes when the viewer is maintained flush with the bottom edge of the punch card. The viewer can be guided upon the lower edge of the punch card by the thumb while grasping the viewer and extending it over the card or by a ledge extending rearwardly from the rear face of the viewer. The viewer has a pocket clip so as to keep the viewer in the pocket of the card reader. Horizontal line designations are provided upon the viewer adjacent to the vertically extending reading slot. There is also provided a card viewer which may extend over the full face of the punch card and which has rearwardly extending ledges at the upper and lower edges of the viewer to keep the card confined against vertical displacement and also has lines to box in the horizontal rows of holes and data upon the card. This full viewer has a vertically extending reading slot on an extension thereof at one end which can be aligned with any vertical row of holes or data upon the card. The viewer can also be provided with space for the displaying of essential data, which aids the reader of the card in making his deductions therefrom.

5 Claims, 11 Drawing Figures

INVENTOR.
HYMAN FANSELOW

BY

Polachek & Saulsbury

ATTORNEYS

PATENTED DEC 5 1972

3,704,938

INVENTOR.
HYMAN FANSELOW
BY
Polachek & Saulsbury
ATTORNEYS

PUNCH CARD VIEWER

The invention relates to a punch card viewer.

It is a principal object of the invention to provide a punch card viewer in which the viewer is made of magnifying glass material and is of such dimension as to extend across the full height of the punch card so as to effect a magnified reading of a vertical row of data upon the punch card without interference from adjacent vertical rows of data.

It is another object of the invention to provide a punch card viewer having a vertical reading slot means in which the punch card viewer is provided in itself with guided ledges for guiding the top and bottom edges of the card.

It is still another object of the invention to provide a punch card viewer which is of such size as can be carried in the pocket of the punch card reader when not in use and in which there is provided a pocket clip for retaining the viewer in the pocket.

It is a further object of the invention to provide a punch card reader which is of such size as to be extended over the full area of the punch card and which will have horizontally extending lines for confining each horizontal row of holes and data upon the card while allowing one to read the vertical rows of information from a magnifying vertically extending reading slot.

Still further objects of the invention are to provide a card punch viewer having the above objects in mind, which is of simple construction, inexpensive to manufacture, light in weight, easy to carry, of pleasing appearance, readily available, effective and efficient in use.

For a better understanding of the invention, reference may be had to the following detailed description taken in connection with the accompanying drawing, in which.

Figures 1, 2, 3, 4, 5, 6, 7, 8:
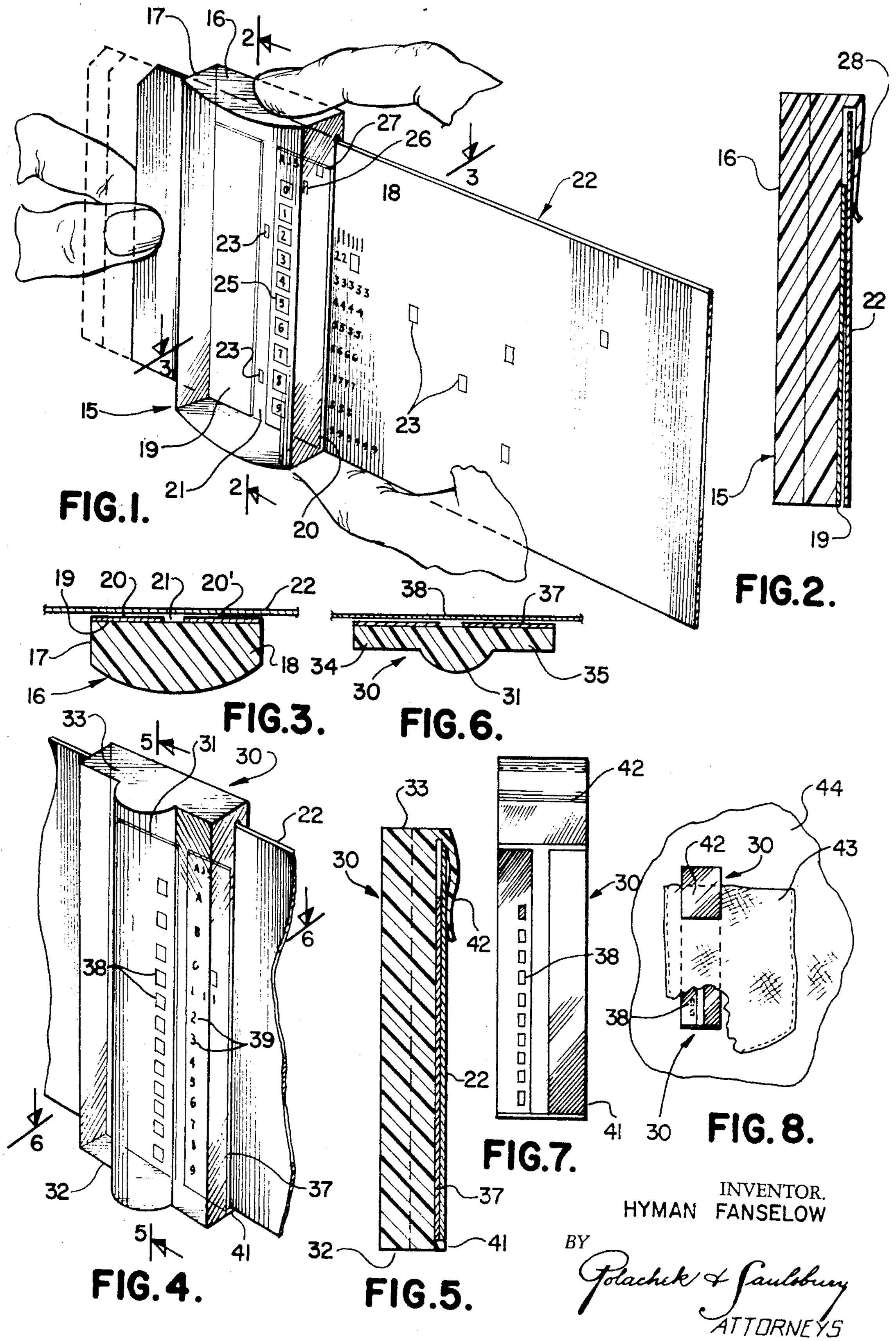
FIG. 1 is a perspective view of the punch card viewer according to one form of the invention and with illustration being made as to the manner in which the viewer is guided over the card.
FIG. 2 is a vertical sectional view of the viewer taken on line 2—2 of FIG. 1.
FIG. 3 is a transverse sectional view of the viewer taken on line 3—3 of FIG. 1.
FIG. 4 is a front perspective view of the punch card viewer according to another form of the invention.
FIG. 5 is a vertical sectional view of the viewer of FIG. 4 taken on line 5—5 thereof.
FIG. 6 is a transverse sectional view of the viewer taken on line 6—6 of FIG. 4.
FIG. 7 is a rear view of the punch card viewer thereof, with various essential data displayed thereover.
FIG. 8 is an elevational view showing the viewer clipped into a pocket.

Referring now particularly to FIGS. 1, 2 and 3, 15 represents a magnifying glass punch card viewer made of transparent plastic or glass with a rounded top surface extending vertically thereover as indicated at 16 with raised opposite side walls 17 and 18 and a flat back wall 19. On the back wall 19 there is adhered two laterally spaced non-transparent sheets or plates 20 and 20' with their outer edges lying flush with the side edges 17 and 18 respectively and their inner edges separated from one another to provide a reading slot 21 through which vertically aligned punched holes 23 in the punched card 22 can be easily read since they are magnified by the viewer glass 15. The holes 23 which have been punched in the card 22 will be readily read against a vertical array of consecutive numbers running from zero to nine as indicated at 25, and respectively horizontally aligned with a similar number of horizontal rows of 80 like digits strung thereacross. The digits will not only be magnified, but also the holes themselves will be magnified and read against the larger horizontal row designations or numbers 25 on the magnifying glass 15. Above the vertical array of designations, zero to nine, are two other horizontal row designations upon the card where holes will be punched to provide other information upon the card.

Upon the upper end of the viewer 15 and extending rearwardly and downwardly therefrom is a pocket clip portion 28 that allows the user of the viewer to place same in the pocket and to keep it from slipping out. This pocket clip 28 also serves to guide and retain the viewer upon the upper edge of the card as it is grasped with the thumb on the bottom of the viewer and fingers on the top of the viewer as shown in FIG. 1 and adjusted across the face of the card to align the viewer with the different holes 23 in different vertical rows upon the card. The thumb will keep the bottom end of the viewer aligned with the bottom edge of the card as the thumb will be drawin over this bottom edge. The thumb and finger of the left hand of the user of the viewer while grasping the left hand end of the card will serve to pull the card over the viewer to align the slot 21 with the different vertical rows which are often difficult to read without some means of magnification. The clip 28 is sufficiently rearwardly extended so as not to interfere with the movement of the card over the rear face of the viewer. This clip 28 will merely hold the viewer upon the card against frontal displacement therefrom. The guiding is effected only through the thumb engaging the lower edge of the card and holding the bottom end face of the viewer flush thereagainst.

Referring now to FIGS. 4 to 8, there is shown another form of the invention, in which 30 represents the magnifying glass, in which the magnification is taken from a central rounded surface 31 extending from a bottom end 32 to a top end 33. This surface 31 bulges outwardly from flat side wings 34 and 35. A data forming sheet 37 is adhered to the entire rear face of the magnifier 30 and has a series of vertically spaced square openings 38 adapted to be respectively aligned with the 12 horizontal rows in which holes are punched and through which readings of the holes can be taken. Number designations of the respective horizontal rows are horizontally aligned with the openings 38 and at one side thereof as indicated at 39. The bulging curved surface 31 overlies the openings 38 and numbers 39 so that both can be read against each other and the holes in the cards readily viewed through the openings 38.

In order that the magnifier 30 can be guided across the lower edge of card 22 there is provided a ledge 41 extending along the lower end 32 and rearwardly thereof. The lower edge of the card 22 will rest upon this ledge 41 and the magnifier can be either moved over the card or the card can be moved over the magnifier in somewhat the same manner as described in connection with the first form of the invention and as shown in FIG. 1. While the lower end of the magnifier is being guided in this manner, the upper edge of card 22 is held against rearward displacement from the magnifier by a depending pocket clip portion 42 under which the card 22 is extended. The magnifier however is still guided from its lower end. As illustrated in FIG. 8 the magnifier 30 can be extended into a pocket 43 of a garment 44 so that its clip will engage the outer face of the pocket 44 as illustrated in FIG. 8 and held in a tight manner therein.

Figures 9, 10, 11:
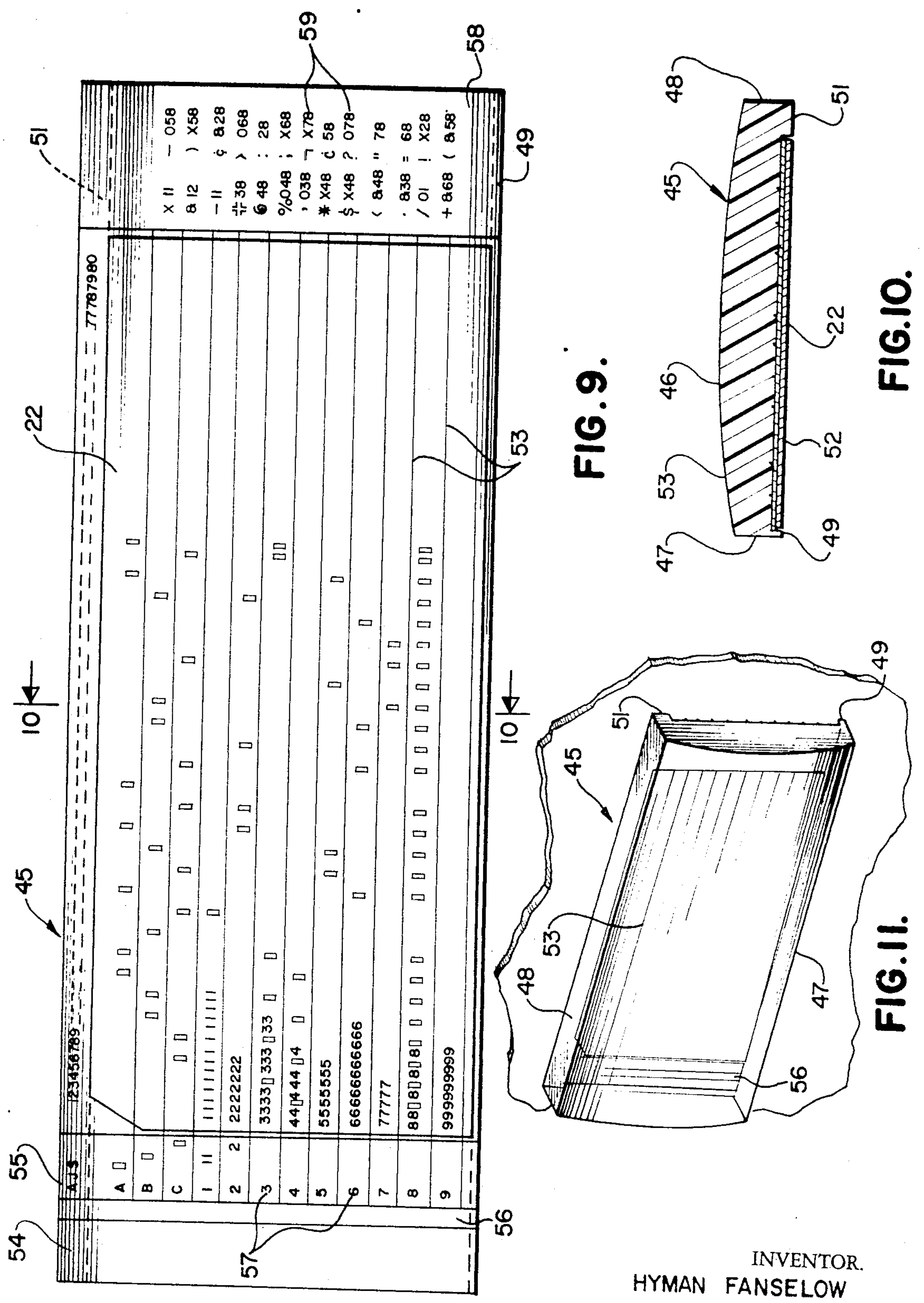
FIG. 9 is a top plan view of a full view punch card viewer comprising one large magnifying glass extending over the full area of the card with a vertical line reading area at one end and essential data display at the other end thereof.
FIG. 10 is a vertical sectional view of viewer of FIG. 9 taken on line 9—9 thereof.
FIG. 11 is a perspective view of the viewer of FIG. 9 removed from the punched card.

Instead of guiding the card over the magnifier or the magnifier over the card, in the form of the invention shown in FIGS. 9 to 11, the card 22 can be placed upon a flat surface and a full area magnifying glass 45 extended thereover. This magnifying glass has a full horizontally extended rounded top surface 46 extending between two side edges 47 and 48 that respectively have drop guide ledges 49 and 51 that are spaced from one another to accommodate the height of the card 22 so as to confine the card with the area defined by these ledges and aligned over a back face 52 on which there are a series of grooves 53 vertically spaced from one another and preferably filled with lined indicating material so as to box in the horizontal rows of the card 22.

At the left end of the magnifier 45 are spaced strips 54 and 55 of sheet material providing for a vertical extending opening 55 so that if more confined reading of the holes is desired, the card 22 can be moved lengthwise from its position under the card and a reading made directly to the reading slot 56 when it is difficult to make the reading from the full exposure of the punch card. The strip 55 has horizontal row designations 57 adjacent to the reading slot 56.

At the opposite end of the viewer there is provided upon the rear face thereof and adhered thereto a card 58 bearing essential data used in the reading of a punched card.

It should be kept in mind that a punch card 22 has twelve horizontal rows extending thereacross and bearing eighty punch hole locations throughout the full horizontal extent of these horizontal rows. The readings are taken in a vertical direction and because of the great amount of data that can be provided by the small holes that are punched in the card these holes necessarily at times have to be small and the indicating numbers have to be small and thus the need for this punch card magnifying glass viewer. While the viewer as shown in the first two forms of the invention is one that is small and can be handled and is of less expense then the large viewer shown in the third form of the invention, it will be seen and appreciated that the same data is being taken from the card by the magnification of the viewer.

What is claimed is:

1. A computer punch card viewer having a flat rear face adapted to overlie a punched computer card between its upper and lower edges and a rounded top surface to provide magnification for the reading of data upon the punched card, said computer card being of the standard type with twelve horizontal rows of punch hole locations and these hole locations being arranged in a plurality of horizontally spaced vertical columns, a vertically extending reading slot extending from the lower end of the viewer to the upper end thereof and measured to extend between the upper and bottom horizontal rows and aligned to view punched holes of a vertical column of hole locations upon the card, the punched holes of the card and the hole locations being magnified upon a reading of the card being made through the vertically extending reading slot, a column of vertically extending designations for the several horizontal rows of the punched hole locations upon the card lying adjacent to the reading slot and spaced from one another equally and corresponding to the horizontal rows of data and holes upon the card, and a horizontally extending guide ledge at one end of the viewer on which the horizontal edge of the computer card may be rested and guided.

2. A punch card viewer, as defined in claim 1, and a pocket clip formation extending rearwardly and downwardly from the upper end of the viewer and serving to maintain the upper edge of the card against the rear face of the viewer while the card is being guided along the rearwardly extending ledge at the bottom of the viewer.

3. A punch card viewer, as defined in claim 1, and said curved surface extending vertically upon the viewer and flat side wings extending laterally therefrom.

4. A punch card viewer, as defined in claim 1, and said vertically extending reading slot being in the form of a series of vertically extending holes in the strip upon the rear face of the viewer.

5. A punch card viewer, as defined in claim 4, and said slotted strip providing on its rear face essential data information readable upon reversal of the viewer to present the rear face thereof.

* * * * *